US012606093B1

(12) United States Patent
Urbano

(10) Patent No.: US 12,606,093 B1
(45) Date of Patent: Apr. 21, 2026

(54) PICKUP TRUCK BED TILT-OUT STORAGE COMPARTMENTS

(71) Applicant: James Urbano, Woodbridge, CT (US)

(72) Inventor: James Urbano, Woodbridge, CT (US)

( * ) Notice: Subject to any disclaimer, the term of this patent is extended or adjusted under 35 U.S.C. 154(b) by 0 days.

(21) Appl. No.: 18/620,919

(22) Filed: Mar. 28, 2024

(51) Int. Cl.
*B60R 7/02* (2006.01)
*B60J 5/04* (2006.01)
*B62D 33/023* (2006.01)

(52) U.S. Cl.
CPC .............. *B60R 7/02* (2013.01); *B60J 5/0491* (2013.01); *B62D 33/023* (2013.01)

(58) Field of Classification Search
USPC ....................................................... 296/37.6
See application file for complete search history.

(56) References Cited

U.S. PATENT DOCUMENTS

| | | | | |
|---|---|---|---|---|
| 4,861,093 A | * | 8/1989 | Chapman ........... | B62D 33/0273 296/180.1 |
| 5,118,019 A | * | 6/1992 | Harrison ................ | B60K 15/05 224/555 |
| 5,564,776 A | | 10/1996 | Schlachter | |
| 5,567,000 A | | 10/1996 | Clare | |
| 5,615,922 A | * | 4/1997 | Blanchard ................. | B60R 9/02 224/404 |
| 5,636,890 A | | 6/1997 | Cooper | |
| 5,667,115 A | | 9/1997 | Verhaeg | |
| 6,003,923 A | | 12/1999 | Scott et al. | |

| | | | | |
|---|---|---|---|---|
| 6,129,401 A | | 10/2000 | Neag et al. | |
| 6,305,730 B1 | | 10/2001 | Stone | |
| 6,312,034 B1 | | 11/2001 | Colman, II et al. | |
| 6,328,366 B1 | | 12/2001 | Foster et al. | |
| 6,439,634 B1 | * | 8/2002 | Jensen ..................... | E05B 83/16 224/403 |
| 6,447,051 B1 | | 9/2002 | Lukomskiy | |
| 6,464,276 B1 | * | 10/2002 | Gruich ............... | B62D 33/0273 224/403 |
| 6,485,077 B1 | | 11/2002 | Foster et al. | |
| 6,966,593 B2 | * | 11/2005 | Plentis ...................... | B60R 9/02 296/37.6 |
| 7,128,356 B2 | | 10/2006 | Bassett | |
| 7,371,341 B2 | * | 5/2008 | Youngs ............... | B29C 45/0017 264/250 |
| 7,931,324 B2 | | 4/2011 | Henderson et al. | |
| 8,210,590 B1 | * | 7/2012 | Moberg ................... | B60J 5/042 224/544 |
| 8,500,183 B2 | | 8/2013 | Malley et al. | |
| 9,783,129 B2 | | 10/2017 | Roach et al. | |

(Continued)

*Primary Examiner* — Joseph D. Pape
(74) *Attorney, Agent, or Firm* — Ware, Fressola, Maguire & Barber LLP

(57) ABSTRACT

A truck bed storage device is provided having a cavity formed in a truck bed wall, defined by an opening in the truck bed wall; a door configured to cover the opening the truck bed wall, a hinge at a base of the door and to affix the door to the truck bed wall. The storage device also may include a pair of lateral wall extensions secured to each lateral side of the door that expand away from the truck bed wall upon opening of the door and contract into the truck bed wall upon closing of the door. An upper portion of the door is configured to tilt away from the upper portion of the truck bed wall while the base of the door remains affixed to the truck bed wall, including a compartment that fits into a cavity in the inner sidewall or affixed to the sidewall.

13 Claims, 6 Drawing Sheets

(56)        References Cited

U.S. PATENT DOCUMENTS

| | | | |
|---|---|---|---|
| 10,040,490 B2 | 8/2018 | Schlaupitz et al. | |
| 10,744,958 B2 | 8/2020 | Wilkie | |
| 11,186,227 B2 * | 11/2021 | Cho ......................... | B60R 7/02 |
| 11,618,369 B2 | 4/2023 | Murray | |
| 2001/0050491 A1 | 12/2001 | Clare et al. | |
| 2008/0231066 A1 | 9/2008 | Harrell | |
| 2008/0272627 A1 | 11/2008 | Joab | |
| 2009/0189404 A1 * | 7/2009 | Anderson ................ | B60R 7/02 |
| | | | 296/37.6 |
| 2021/0229606 A1 | 7/2021 | Zitting | |
| 2022/0144345 A1 | 5/2022 | Luo | |
| 2022/0289312 A1 | 9/2022 | Aquila et al. | |
| 2023/0257033 A1 | 8/2023 | Harmon et al. | |

* cited by examiner

PICKUP TRUCK BED TILT-OUT STORAGE COMPARTMENTS

FIELD OF THE INVENTION

The present invention relates to storage compartments for trucks, and more particularly, to storage compartments that are built into the inside walls of a pickup truck bed, but are accessed from alongside the bed.

BACKGROUND OF THE DISCLOSURE

A substantial benefit of pickup trucks is that they provide a significant amount of space for storage and transport, such as for construction, home projects, and the like, which can be stored and transported in the bed of the pickup truck. However, because of their size, it can often be difficult to retrieve items from the pickup truck bed, as when an object is stored on the pickup truck bed's floor, it will often require climbing into the pickup truck bed to retrieve the item, as it is likely located too far from a user standing outside the truck. This is a particular inconvenience when the user is looking to retrieve a smaller object, such as a tool or groceries, from the pickup truck bed, where the larger floor space for storage is not necessarily required.

SUMMARY OF THE DISCLOSURE

The present application relates to a novel use of the inner sidewalls of a pickup truck bed for tilt-out storage compartments, which can be used to contain small items during transport. The interior truck bed compartments are easily accessible from outside the truck bed, within arm's reach, affording the convenience of quick access for transporting smaller items, safely concealed from view.

A primary purpose of the tilt-out compartment is to store larger objects in the open position, as demonstrated by the grocery bag drawing. The compartment is easily accessed from outside the truck bed and allows for a package to be safely contained, instead of carried unrestrained on the truck bed floor. Smaller items, like a compact tool set, for example, can be stored in the compartment in the closed position. Given that the truck bed cavity is limited in depth (which varies, depending on the truck brand), the closed compartment is suitable for storing and carrying smaller items in the closed position, while larger items can be carried in the open position.

The compartments are easily and conveniently accessible by a person standing alongside the bed. The top, flat surface of the truck bed wall may be at the top of the compartment and include a compartment latch, within easy reach from outside the truck. The compartment door then tips or tilts away from the user (toward the center of the bed), allowing a tool or a grocery bag to be dropped into the opening, with no need to climb into the bed to access or retrieve the object. In a simple iteration, the storage compartment can be formed by cutting a section of the inner bed, which becomes the face of the compartment, hinged at the bottom with strapped or netted sides. Alternatively, the section of the side wall can be cut away and removed, creating space for a manufactured compartment that fits into the cavity and tilts out.

The compartment sides can comprise an elastic netting or a fanfold material that expands as the face or door is opened and retracts into the side wall cavity as it is closed. The sides contain smaller items from spilling into the sidewall cavity.

Other means of restraining the compartment face or door during travel may include either a cable restraint or a hinged restraint.

A second configuration of the storage compartment can be to cut and remove a section of the bed's inner sidewall, and in the opening install a manufactured, custom-made molded plastic tilt-out storage compartment, with the size varying according to the available cavity space. The face can be double-hinged so as to create a floor, with the sides also comprising either elastic netting or a fanfold material, which retracts into the bed sidewall cavity when closing. The lower bed cavity is closed off to prevent items from falling into the cavity.

The size and number of the openings may be determined by the requirement to maintain the bed's structural integrity, and structural reinforcements for the compartments can also be provided.

In accordance with a first aspect of the application, a truck bed storage device is provided. The truck bed storage device comprises a cavity formed in a truck bed wall, defined by an opening in the truck bed wall; a door configured to cover the opening in the truck bed wall; and a hinge arranged at a base of the door and configured to affix the door to the truck bed wall. The truck bed storage device also may comprise a pair of lateral wall extensions, each being secured to a lateral side of the door and configured to expand away from the truck bed wall upon opening of the door and contract into the truck bed wall upon closing of the door. The truck bed storage device also may comprise an upper portion of the door being configured to tilt away from a corresponding upper portion of the truck bed wall while the base of the door remains affixed to the truck bed wall, to open the truck bed storage device, and towards the upper portion of the truck bed wall to close the truck bed storage device.

Implementations of the truck bed storage device may include one or more of the following features, separately or in combination. The upper portion of the door of the truck bed storage device may include an upper surface perpendicular to a face of the door, and which aligns with an upper surface of the truck bed wall. The pair of lateral wall extensions may include netting configured to expand away from the truck bed wall upon opening of the door and contract into the truck bed wall upon closing of the door. The pair of lateral wall extensions may include foldable walls configured to fold out upon opening of the door and contract upon closing of the door. The truck bed storage device may further comprise: a bed wall cavity closure dimensioned to fit into the cavity and having include a back wall, a base wall, and two side walls, the bed wall cavity closure being configured to seal the cavity in the truck bed wall. The door of the truck bed storage device may include a second hinge positioned above the hinge at the base of the door, the door being further configured to rotate about the second hinge to provide a substantially flat floor space when the door is opened. The upper portion of the door may include a latch configured to secure the door in a closed position. The truck bed storage device may comprise one or more cable restraints attaching the door to the truck bed wall and configured to limit an opening distance of the door. The truck bed storage device may include one or more hinged restraints attaching the door to the truck bed wall and configured to limit an opening distance of the door. The door of the truck bed storage device may be made of the same material as the truck bed wall. The truck bed storage device may also include a latch located on an upper surface of the truck bed wall.

3

DETAILED DESCRIPTION OF THE DRAWINGS

The truck bed storage compartments of the present application will now be described with reference made to FIGS. 1-5b.

Figure 1:
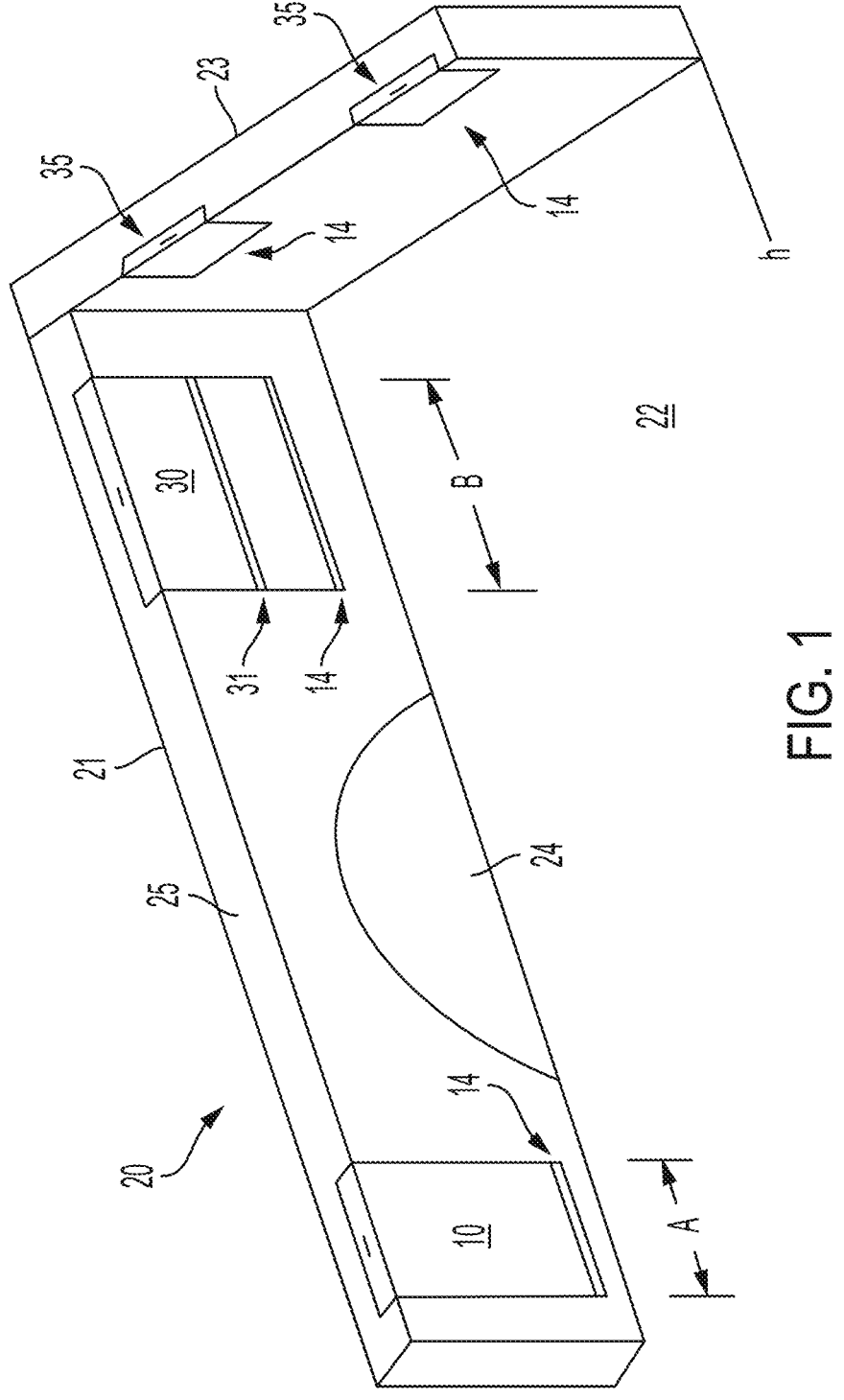
FIG. 1 shows a perspective view of a truck bed comprising multiple storage compartments according to the present application.
Figure 2A:
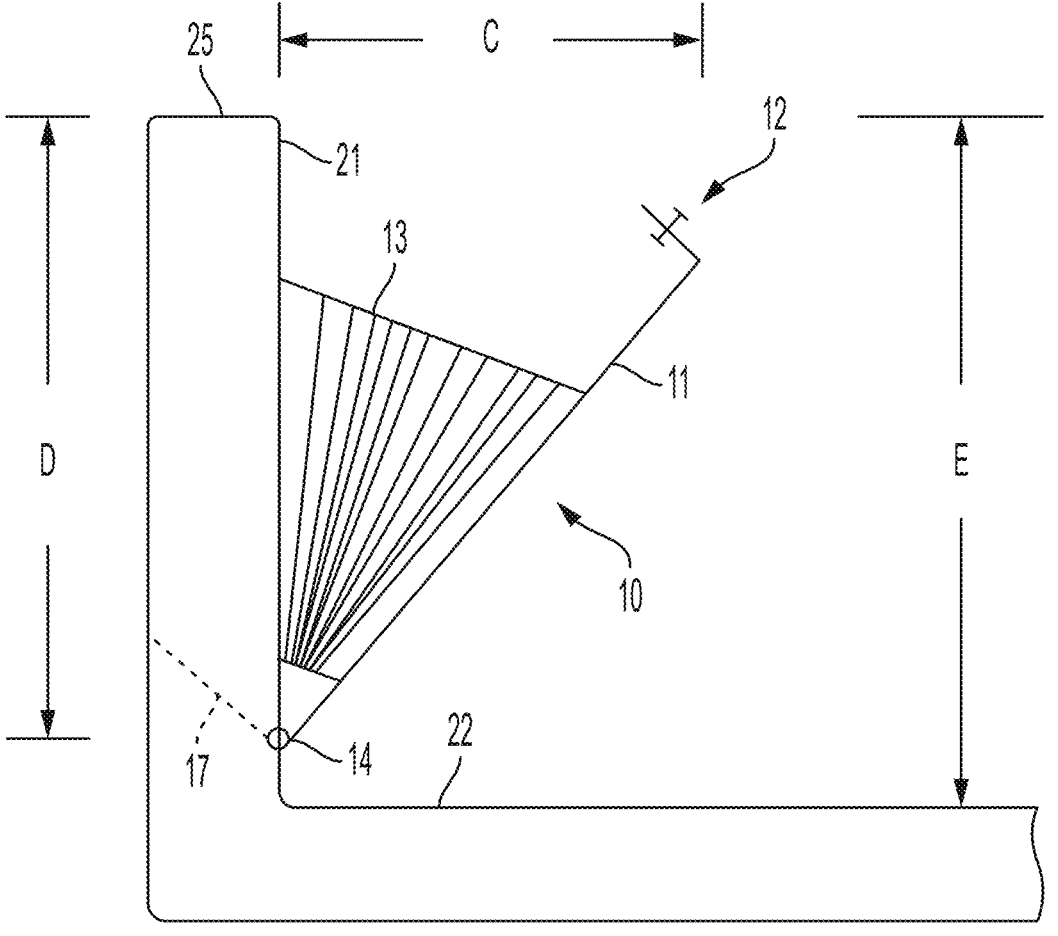
FIG. 2a shows a side view of a first, single-hinged storage compartment according to the present application.
Figure 2B:
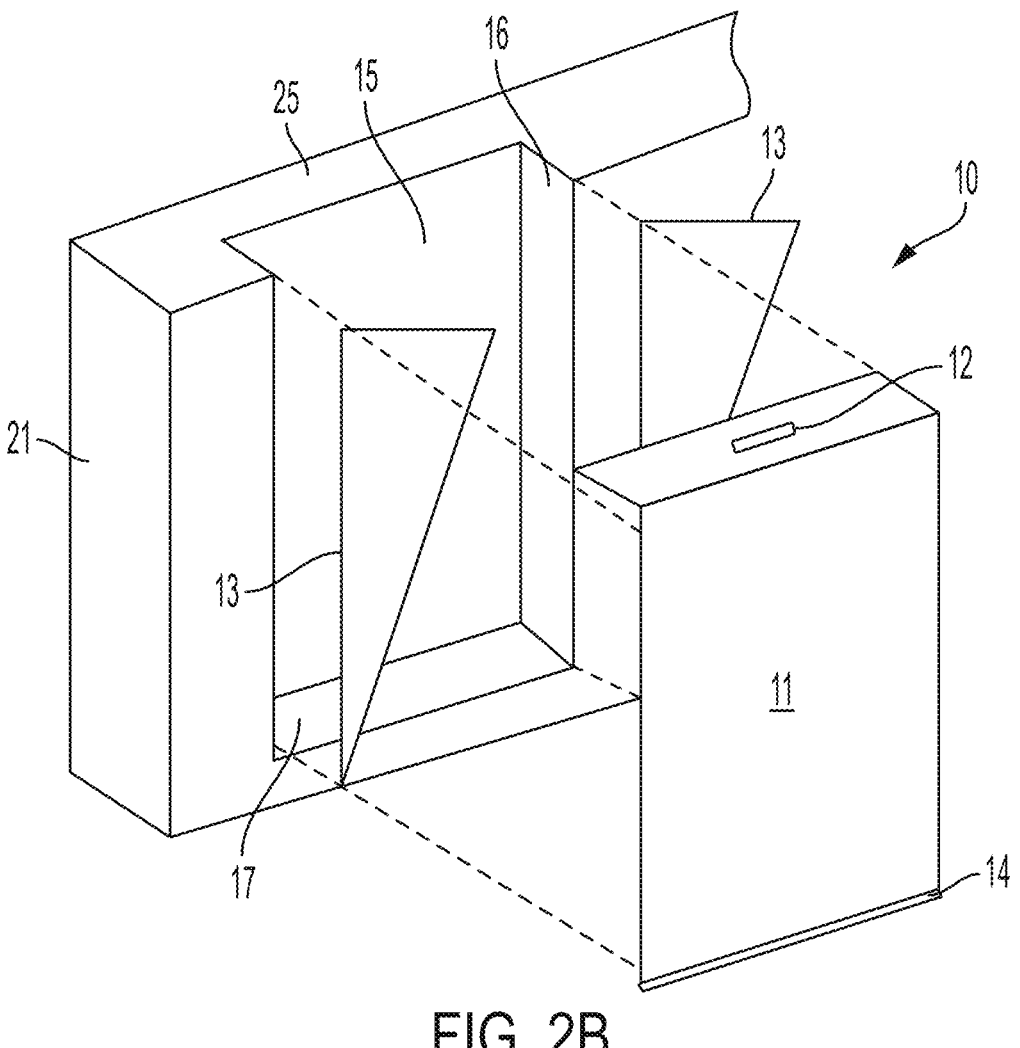
FIG. 2b shows an exploded view of the first, single-hinged storage compartment according to the present application.

FIG. 1 illustrates a truck bed 20 including a plurality of in-wall storage compartments 10, 30, 35. The present application seeks to utilize the space within truck bed walls 21, 23 to provide storage compartments 10, 30, 35 that may be used to provide defined storage areas in the truck bed 20, so the user can easily and conveniently access stored objects from outside of the truck, or to transport larger items so that the user may not need to place those objects on the truck bed floor 22. For example, the storage compartments 10, 30, 35 may be used for storing smaller objects while leaving the truck bed floor 22 empty for larger objects. The storage compartments 10, 30, 35 being positioned around the perimeter of the truck bed 20, and comprising easily opened tilt-out constructions that open from the top, enable the user to easily access small items stored in the compartments 10, 30, 35 from outside of the truck bed 20 without requiring extensive reach into the truck bed 20.

In accordance with the present application, a storage compartment 10 is provided, which is a hinged compartment that tilts out of the truck bed wall 21. The storage compartment 10 is shown in further detail in FIGS. 2a and 2b. A section of the truck inner truck bed wall 21 of the pickup truck bed 20 is cut to create a cavity in the truck bed wall 21. In the cavity, a manufactured, tilt-out storage compartment 10 is installed. The storage compartment 10 can be made from plastic or from other materials, such as metal. The compartment 10 may comprise a bed wall cavity closure that is dimensioned to fit in the space cut out from the truck bed wall 21, comprising a back wall 15, side walls 16, and base 17 that is arranged within the truck bed wall 21, and which contains the items in the compartment 10 and prevent them from falling into the truck bed wall 21 when closed.

The compartment 10 comprises a door 11, provided to cover the cavity closure. The door 11 comprises a hinge 14 along the bottom edge to allow the opening and closing of the compartment 10 from the top, as the door 11 pivots upon the hinge 14. The door 11 tilts out from the truck bed wall 21 to expose the cavity. The door 11 may be formed of the section of the truck bed wall 21 that was cut from the truck bed wall 21 in creating the cavity of the compartment 10, such that it has a substantially seamless and uniform appearance within the truck bed wall 21. Alternatively, the door 11 may be made from a different material than the truck bed wall 21.

At the top of the compartment door 11, a latch 12 can be provided to secure the door 11 closed. A handle (not shown) could be provided in addition to or in place of the latch 12, which is used to open and close the door. In embodiments where the compartment 10 is cut out from the truck bed wall 21 in a way that also comprises cutting out a portion of the top surface 25 of the truck bed wall 21, the handle and/or latch 12 may be positioned on an upper surface of the door 11 that aligns with the top surface 25 of the truck bed wall 21, as shown for example in FIGS. 1 and 2b. The latch 12 may also be arranged on the top surface 25 of the truck bed wall 21. The compartment 10 may also comprise magnetic clasps employed to hold the door 11 closed, which may comprise corresponding magnetic elements on an inner surface of the door 11 and on the truck bed wall 21.

The compartment 10 may further comprise lateral wall extensions 13 on each lateral end that extend out with the door 11, to contain the materials in the compartment 10 when the door 11 is opened or closed. The lateral wall extensions 13 can comprise an elastic netting or mesh, or a fanfold-type material that expands as the door 11 is opened and retracts into the cavity of the truck bed wall 21 as the door 11 is closed. The lateral wall extensions 13 prevent items from spilling onto the truck bed floor 22 when the compartment 10 is opened, and from falling into the cavity when closed.

Figures 3C, 4:
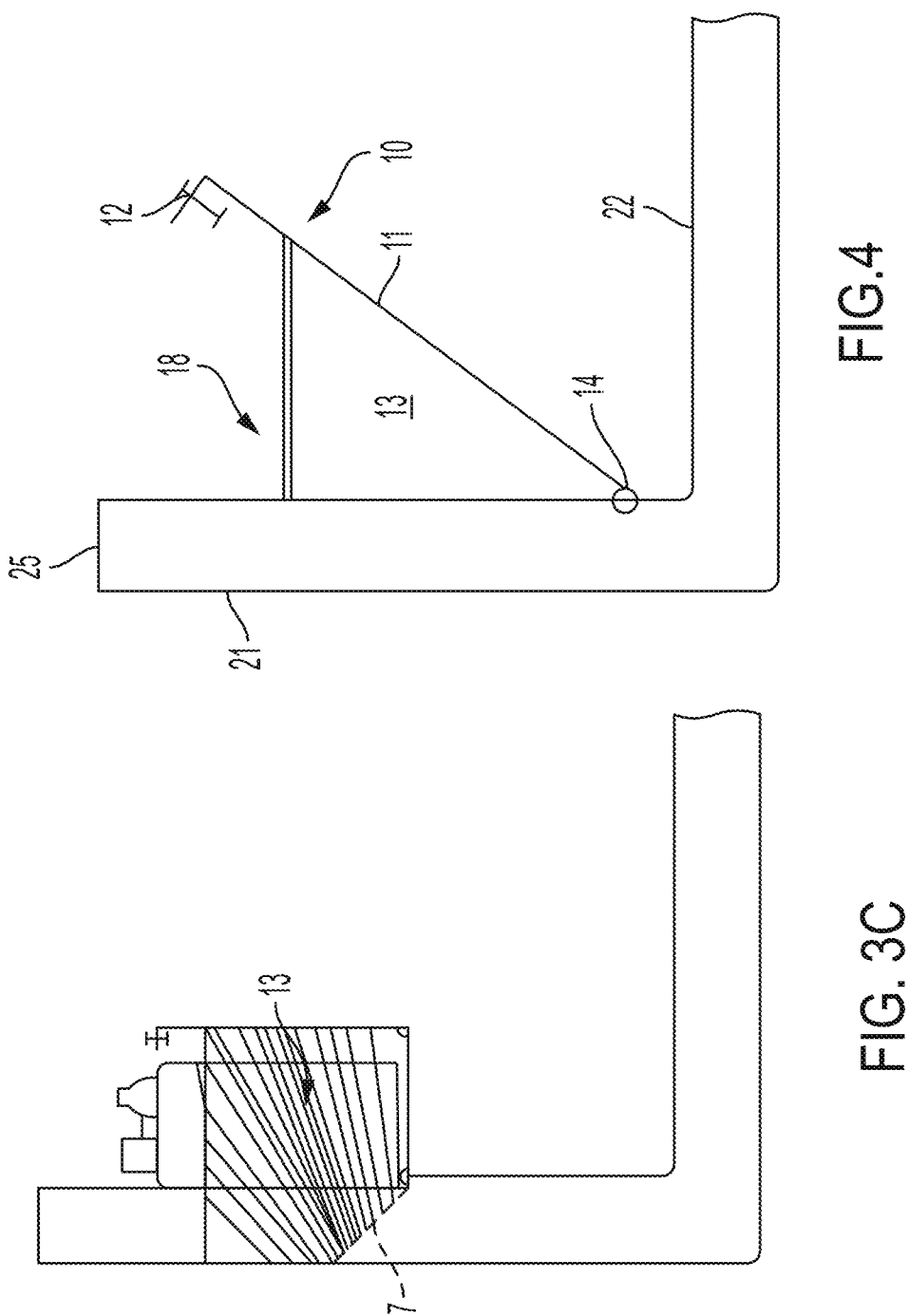
FIG. 4 shows a storage compartment comprising a cable restraint according to the present application.

The compartment 10 may also comprise mechanisms for restraining the compartment door 11 and prevent the compartment door 11 from over-extending when the door 11 tilts open. The compartment 10 may comprise, for example, a cable restraint 18 as shown in FIG. 4. The cable restraint 18 may comprise one or more cables, which are connected at one end to the door 11 of the compartment 10, and connected at the opposite end to any one or more of the components fixed to the truck bed wall 21, such the truck bed wall 21 itself, the back wall 15, and/or the side walls 16.

Figure 5B:
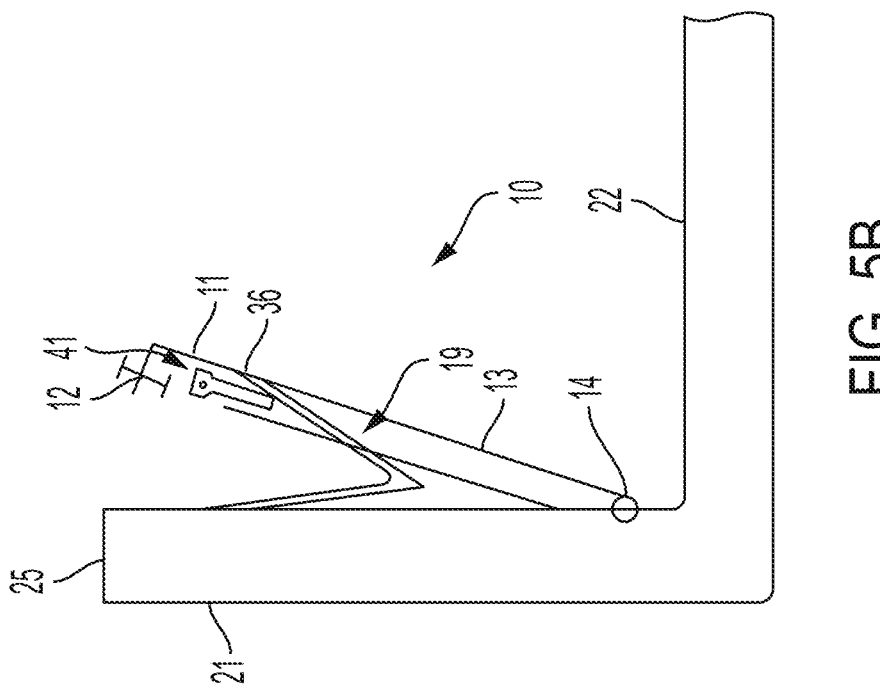
FIG. 5b shows a storage compartment comprising a further tool storage compartment according to the present application.
Figure 5A:
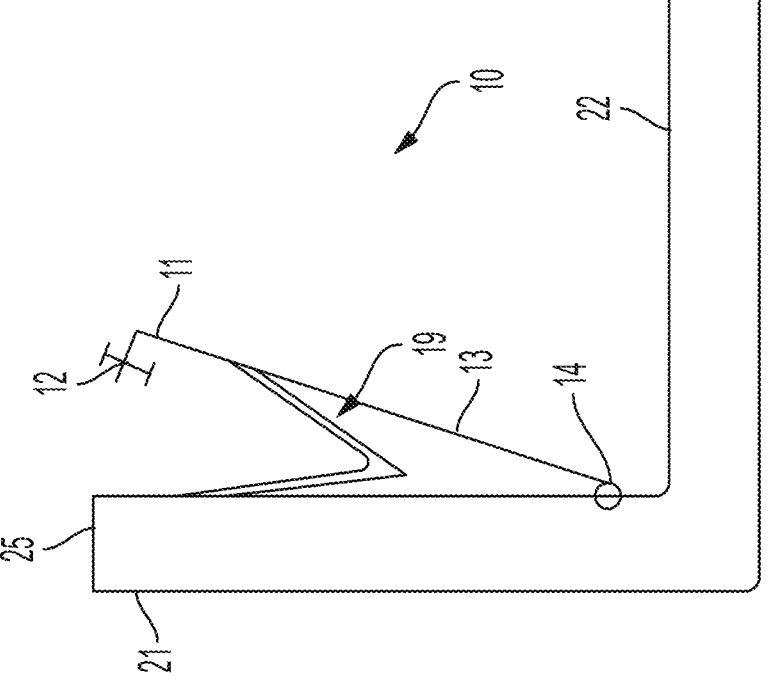
FIG. 5a shows a storage compartment comprising a hinged restraint according to the present application.

In alternative embodiments, a hinged restraint 19 can be provided, as shown for example in FIG. 5a. The hinged restraint 19 can be affixed at one end to the door 11 of the compartment 10, and connected at the opposite end to the truck bed wall 21. The hinged restraint 19 may comprise a metallic or plastic bar having a hinge in the center or along its length, which allows the bar to fold for storage when the compartment 10 is closed, and which can be extended and locked when the compartment 10 is opened. The compartment 10 may comprise one or more such hinged restraints 19 along its length.

FIG. 5b shows a version of the tilt-out compartment 10 where a manufactured compartment 36 is installed in the bed sidewall cavity, created by cutting out a bed wall section to accept the molded tilt-out unit. The compartment 36 in this configuration is a tool caddy, where tools or objects 41 can be secured and stored, conveniently facing the individual when opened, easily visible and accessible within arm's reach. This compartment 36 can be manufactured in various depths, depending on the size of the objects that need to be secured. A clear interior depth of 6" will accommodate most commonly used power and hand tools.

In a further iteration of the tilt-out compartment, a manufactured storage unit is surface mounted to the pickup bed side wall. The tilt out unit could be molded such that it fits over the bed wheel well hump. This iteration does not require cutting the inner wall of the pick-up bed. The compartment is simply attached to the bed sidewall with appropriate fasteners. It can be manufactured in various widths, lengths and heights, depending on the user's needs.

Figures 3A, 3B:
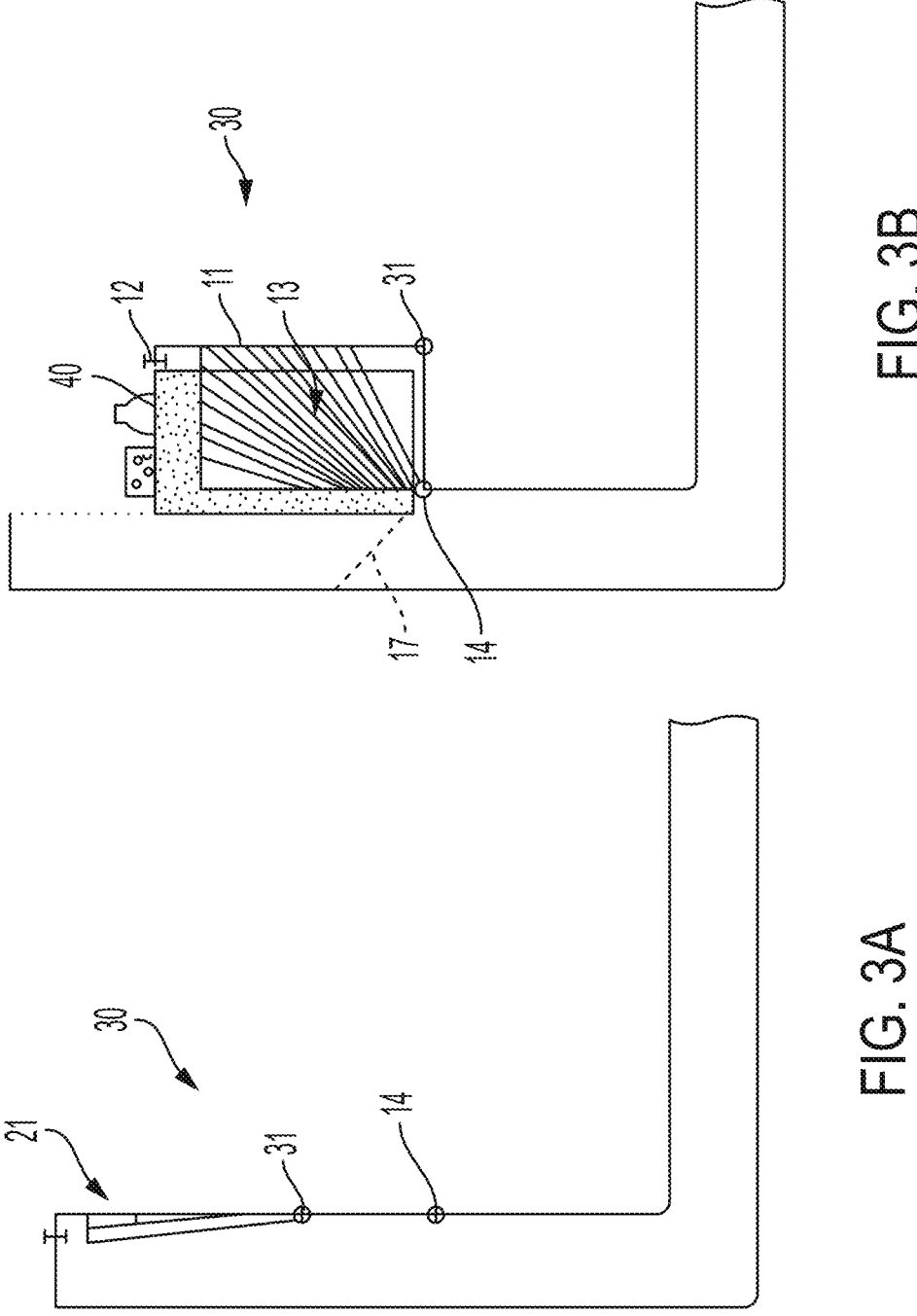
FIG. 3a shows a side view of a second, double-hinged storage compartment in a closed position according to the present application.
FIGS. 3b and 3c shows a side view of a second, double-hinged storage compartment in an open position according to the present application.

A configuration of a double-hinged storage compartment 30 for storing objects 40 is shown in FIGS. 3*a*-3*c*. Similar to the single-hinged compartment 10, a cavity for the compartment 30 is cut into the truck bed wall 21 of the truck bed 20 and a section of the truck bed wall 21 is removed. In the opening, a molded plastic or metallic tilt-out storage compartment 30 is installed, which may be similar in size and comprise the previously described structural components as the single-hinged compartment 10, with the size varying according to the available cavity space.

The door 11 of the compartment 30 comprises two hinges 14, 31. When the door 11 is opened, it may tilt outwardly on the base hinge 14, as with the single hinge compartment 10. A second hinge 31 is provided along the length of the door 11 above the base, which allows the creation of a flat floor as shown in FIGS. 3*b* and 3*c*. The door 11 can pivot about the hinge 31 to create a right-angle bend in the door 11, creating floor space within the compartment 30 when it is opened. The lateral wall extensions 13 of the compartment may also comprise elastic netting or a fanfold material, which retracts into the truck bed wall 21 cavity when closing. The lower bed cavity is closed by a base 17 of the bed wall cavity closure off to prevent items from falling into the cavity. Either mechanical or magnetic latches 12 can be used to secure the door 11, as previously discussed, and a handle (not shown) may also be provided.

In an exemplary embodiment of the compartment 10, the compartment 10 may have a width (A) of approximately twelve inches and a height (D) of approximately nineteen inches. The compartment 10 may extend outwardly (C) approximately thirteen inches. The compartment 30 may have a width (B) of twenty-four inches. In the embodiment of the truck bed 20 shown in the Figures, the truck bed wall 21 may have a height (E) approximately twenty-one inches. However, the compartments 10, 30 can vary in height, depth, and width, depending on the space available on either side of the rear wheel wells 24 of the truck bed 20, and for example, the compartments 10, 30, can be constructed in any width depending on the truck bed 20 and needs. Further, although the embodiment of the truck bed 20 shown in FIG. 1 includes one single-hinged compartment 10 and one double-hinged compartment 30, it should be noted that this is for illustrative purposes only, and the compartments 10, 30 can be provided in any combination, and a truck bed 20 can include any number of compartments 10, 30, without limiting the scope of the present application.

Similar compartments 35 for the storage of smaller items may be created on the bed cab wall 23, within arm's reach of a person standing alongside the truck bed 20 or in the truck cab. The compartments 35 can be constructed similar to the compartments 10, 30 described herein, and comprise similar structural components.

As used herein, directional or positional terms such as "front", "rear", "upper", "lower", "top", "bottom", etc., are used for explanatory purposes and are not limiting.

While there have been shown and described and pointed out fundamental novel features of the invention as applied to embodiments thereof, it will be understood that various omissions and substitutions and changes in the form and details of the apparatus and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A truck bed storage device comprising:
a tilt-out compartment that is mounted to an outer surface of a truck bed inner wall which faces towards the interior of a truck bed, wherein the truck bed inner wall comprises an upper surface, the compartment comprising:
a cavity configured to store one or more objects and having an opening;
a door having a face positioned towards the interior of the truck bed;
a hinge arranged at a base of the door of the compartment and about which the door rotates to enable access into the cavity; and
a pair of lateral wall extensions, comprising a lateral wall extension being secured to each lateral side of the door, each lateral wall extension configured to expand away from the truck bed wall upon opening of the door and contract towards the truck bed wall upon closing of the door;
wherein an upper portion of the door comprises an upper surface perpendicular to the face of the door, and which aligns with the upper surface of the truck bed inner wall;
wherein the upper portion of the door is configured to tilt away from a corresponding upper portion of the truck bed inner wall to expose the cavity while the compartment remains affixed to the truck bed inner wall to open the truck bed storage device to an open position, and towards the upper portion of the truck bed inner wall to close the truck bed storage device to a closed position;
wherein the upper portion of the door further comprises a latch positioned on the upper surface and configured to secure the door in the closed position, wherein operation of the latch allows for opening of the truck bed storage device to the open position; and
wherein the cavity is defined between the door, the pair of lateral wall extensions, and the outer surface of the truck bed inner wall.

2. The truck bed storage device according to claim 1, wherein the pair of lateral wall extensions comprise netting configured to expand away from the truck bed inner wall upon opening of the door and contract towards the truck bed inner wall upon closing of the door.

3. The truck bed storage device according to claim 1, wherein the pair of lateral wall extensions comprise foldable walls configured to fold out upon opening of the door and contract upon closing of the door.

4. The truck bed storage device according to claim 1, wherein the door comprises a second hinge positioned above the hinge at the base of the door, the door being further configured to rotate about the second hinge to a substantially flat floor space when the door is opened.

5. The truck bed storage device according to claim 1, further comprising one or more cable restraints attaching the door to the truck bed inner wall and configured to limit an opening distance of the door.

6. The truck bed storage device according to claim 1, further comprising one or more hinged restraints attaching the door to the truck bed inner wall and configured to limit an opening distance of the door.

7. The truck bed storage device according to claim 1, wherein the door is comprised from the same material as the truck bed inner wall.

8. The truck bed storage device of claim 1, wherein the tilt-out compartment is mounted to the outer surface of the truck bed inner wall allowing access to the compartment by a person standing in a position located exterior to the truck bed.

9. The truck bed storage device of claim 1, wherein at least the door of the tilt-out compartment is made from a metallic material.

10. The truck bed storage device of claim 1, wherein at least the door of the tilt-out compartment is made from a plastic material.

11. The truck bed storage device of claim 9, wherein the pair of lateral wall extensions of the tilt-out compartment is made from a netted or mesh material or comprises straps.

12. The truck bed storage device of claim 1, wherein the tilt-out compartment comprise a frame configured to hinge away and towards the truck bed inner wall.

13. The truck bed storage device of claim 1, wherein the tilt-out compartment is configured to clench or clamp an article against the truck bed inner wall.

\* \* \* \* \*